United States Patent
Onuki

(10) Patent No.: US 8,205,014 B2
(45) Date of Patent: Jun. 19, 2012

(54) INFORMATION APPARATUS AND METHOD OF GENERATING TUNING PLAN FOR RESOURCE CONFIGURATION OF STORAGE SYSTEM

(75) Inventor: Kiyoshi Onuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 12/310,038

(22) PCT Filed: Feb. 2, 2009

(86) PCT No.: PCT/JP2009/000378
§ 371 (c)(1),
(2), (4) Date: Feb. 9, 2009

(87) PCT Pub. No.: WO2010/086902
PCT Pub. Date: Aug. 5, 2010

(65) Prior Publication Data
US 2010/0325314 A1   Dec. 23, 2010

(51) Int. Cl.
*G06F 3/00* (2006.01)
(52) U.S. Cl. .......................................................... 710/5
(58) Field of Classification Search ......... 710/5; 709/226
See application file for complete search history.

(56) References Cited

U.S. PATENT DOCUMENTS

| | | | |
|---|---|---|---|
| 6,664,964 B1 * | 12/2003 | Levin-Michael et al. | 345/440 |
| 2004/0193827 A1 | 9/2004 | Mogi et al. | |
| 2007/0198797 A1 * | 8/2007 | Kavuri et al. | 711/165 |
| 2007/0226328 A1 | 9/2007 | Kusama et al. | |
| 2008/0098110 A1 | 4/2008 | Takeda et al. | |

FOREIGN PATENT DOCUMENTS

| | | |
|---|---|---|
| JP | 2005-062941 | 8/2003 |
| JP | 2007-233783 | 3/2006 |

OTHER PUBLICATIONS

International Search Report of PCT/JP2009/000378 mailed Aug. 6, 2009.

* cited by examiner

*Primary Examiner* — Tariq Hafiz
*Assistant Examiner* — Aurangzeb Hassan
(74) *Attorney, Agent, or Firm* — Hitachi America, Ltd.

(57) ABSTRACT

A tuning plan for a configuration of a resource of a storage system 5 is generated by acquiring configuration information of the resource of the storage system 5, and acquiring performance data of a reference value exceeding resource that is the resource having a utilization rate exceeding a preset reference value, and performance data of an analysis target resource that is a resource having a certain relationship with a reference value exceeding resource, and obtaining correlation degree between the reference value exceeding resource and the analysis target resources based on the performance data of the reference value exceeding resource and the performance data of the analysis target resources, and selecting a correlated analysis target resource that is the analysis target resource determined to have correlation with the reference value exceeding resource from the obtained correlation degree, and by calculating an average resource utilization rate of a resource group in a predetermined range on the basis of the selected correlated analysis target resource such that the average resource utilization rate becomes equal to or less than a predetermined threshold value.

13 Claims, 20 Drawing Sheets

[Fig. 1]
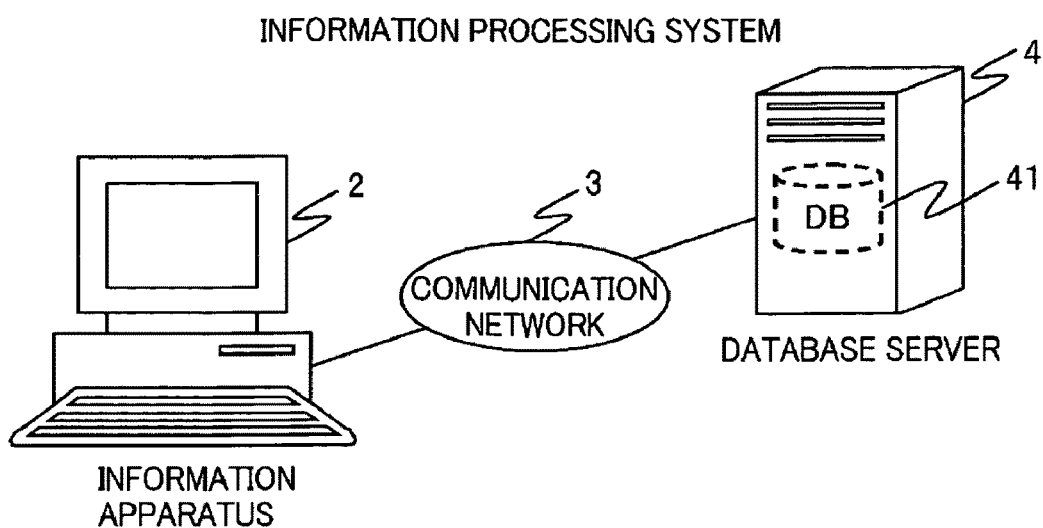
[Fig. 2]
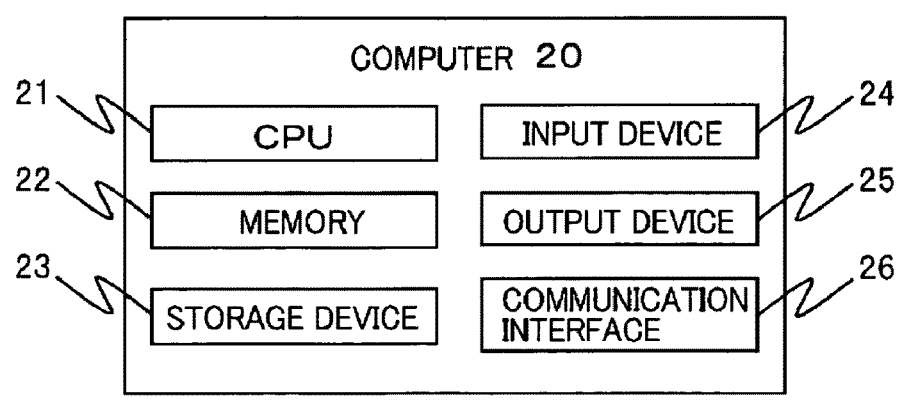

[Fig. 3A]
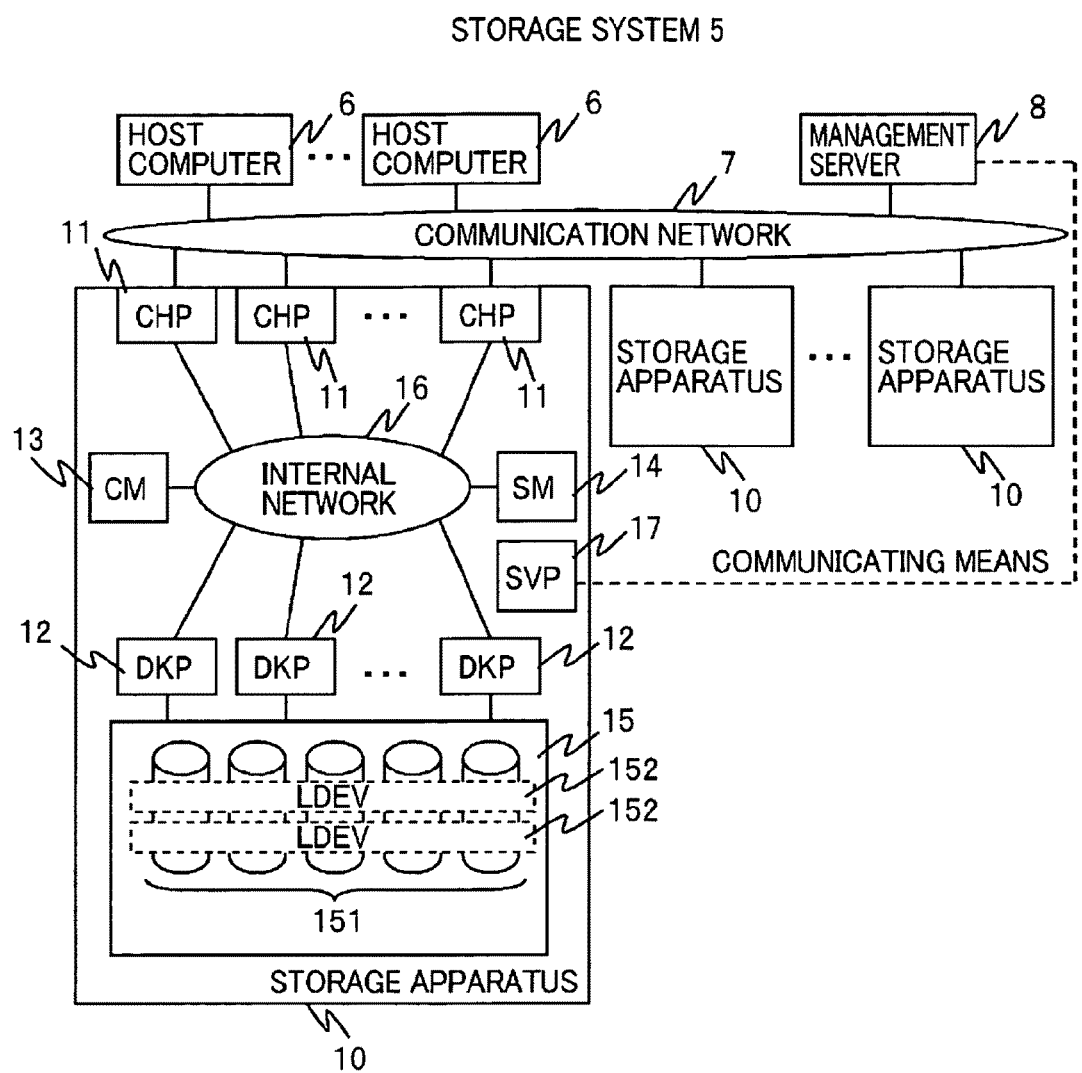

[Fig. 3B]
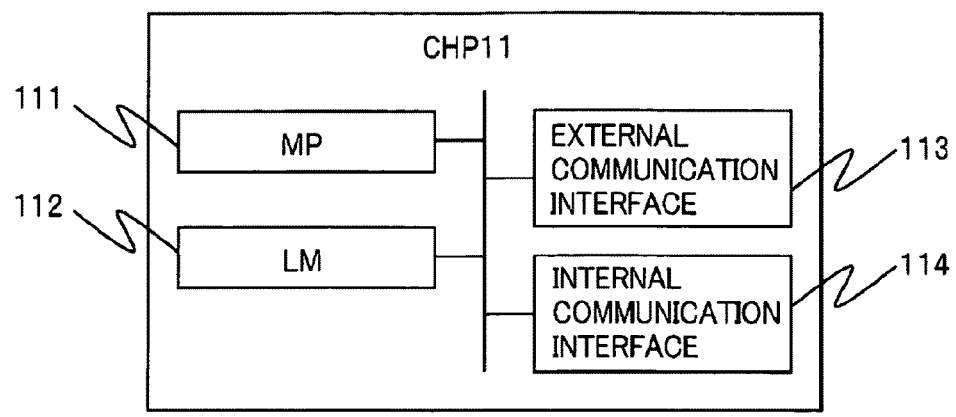
[Fig. 3C]
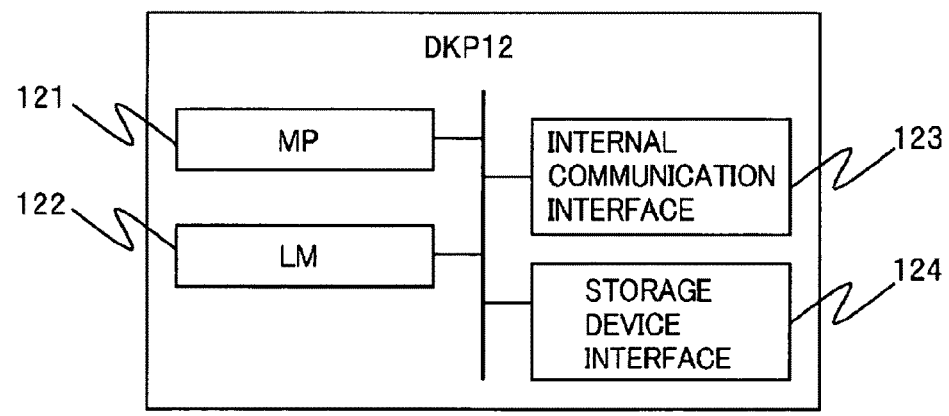

[Fig. 4]
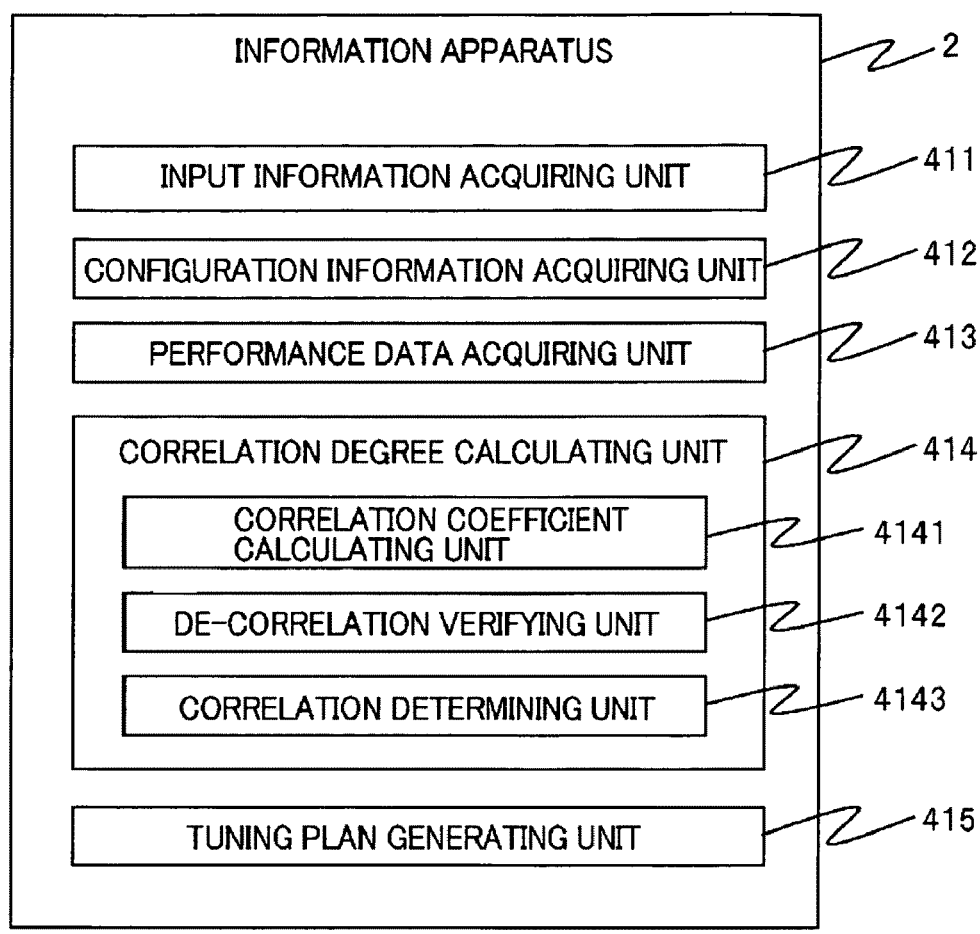

[Fig. 5]

INPUT INFORMATION 500

| CUSTOMER NAME | ○○○○ CO., LTD. | 511 |
|---|---|---|
| EXAMINATION DATE | 2008/12/22 | 512 |
| REFERENCE VALUE EXCEEDING RESOURCE INFORMATION | RESOURCE TYPE | CHP | 5131 } 513 |
| | RESOURCE NAME | CHP00/1E | 5132 |
| ANALYSIS TARGET RESOURCE INFORMATION | RESOURCE TYPE | LDEV | 5141 } 514 |
| | RESOURCE NAME | 00:00:02 | 5142 |
| COST CLASSIFICATION | COST ORIENTED | 515 |
| ANALYSIS START TIME | 2008/12/8  10:00 | 5161 } 516 |
| ANALYSIS END TIME | 2008/12/8  13:00 | 5162 |

[Fig. 6]

CONFIGURATION INFORMATION 600

| INFORMATION ON STORAGE APPARATUS | 611 |
|---|---|
| INFORMATION ON CHP | 612 |
| INFORMATION ON DKP | 613 |
| INFORMATION ON CM | 614 |
| INFORMATION ON SM | 615 |
| INFORMATION ON LDEV | 616 |
| INFORMATION ON RAID GROUP | 617 |
| INFORMATION ON DISC DRIVE | 618 |
| INFORMATION ON I/O PATH | 619 |
| ... | |

[Fig. 7A]

EXAMPLE OF ACQUIRED PERFORMANCE DATA 700

NAME OF LDEV PERFORMANCE DATA COLLECTION FILE FOR RAID GROUP 5-1
PERFORMANCE DATA COLLECTION STORAGE
PERFORMANCE DATA COLLECTION TIMES
PERFORMANCE DATA COLLECTION INTERVAL

LDEV ALLOCATED TO RAID GROUP 5-1

| No. | time | 0:00:01 | 0:00:02 | 0:00:03 |
|-----|------|---------|---------|---------|
| 1 | 2007/6/1 10:00 | 20 | 24 | 5 |
| 2 | 2007/6/1 10:15 | 22 | 22 | 3 |
| 3 | 2007/6/1 10:30 | 21 | 28 | 4 |
| 4 | 2007/6/1 10:45 | 3 | 5 | 3 |
| 5 | 2007/6/1 11:00 | 4 | 5 | 5 |
| 6 | 2007/6/1 11:15 | 5 | 5 | 5 |
| 7 | 2007/6/1 11:30 | 4 | 4 | 4 |
| 8 | 2007/6/1 11:45 | 5 | 5 | 6 |
| 9 | 2007/6/1 12:00 | 4 | 3 | 4 |
| 10 | 2007/6/1 12:15 | 4 | 4 | 4 |
| 11 | 2007/6/1 12:30 | 22 | 20 | 7 |
| 12 | 2007/6/1 12:45 | 22 | 22 | 2 |
| 13 | 2007/6/1 13:00 | 21 | 26 | 5 |

UTILIZATION RATES (%) OF LDEV FOR EACH COLLECTION TIME

↓
PERFORMANCE DATA COLLECTION TIMES

[Fig. 7B]

EXAMPLE OF ACQUIRED PERFORMANCE DATA 700

NAME OF LDEV PERFORMANCE DATA COLLECTION FILE FOR RAID GROUP 5-2
PERFORMANCE DATA COLLECTION STORAGE
PERFORMANCE DATA COLLECTION TIMES
PERFORMANCE DATA COLLECTION INTERVAL

| No. | time | 0:10:01 | 0:10:03 |
|-----|------|---------|---------|
| 1 | 2007/6/1 10:00 | 3 | 4 |
| 2 | 2007/6/1 10:15 | 7 | 5 |
| 3 | 2007/6/1 10:30 | 9 | 6 |
| 4 | 2007/6/1 10:45 | 4 | 8 |
| 5 | 2007/6/1 11:00 | 6 | 6 |
| 6 | 2007/6/1 11:15 | 7 | 5 |
| 7 | 2007/6/1 11:30 | 6 | 7 |
| 8 | 2007/6/1 11:45 | 7 | 7 |
| 9 | 2007/6/1 12:00 | 6 | 6 |
| 10 | 2007/6/1 12:15 | 5 | 6 |
| 11 | 2007/6/1 12:30 | 4 | 8 |
| 12 | 2007/6/1 12:45 | 4 | 9 |
| 13 | 2007/6/1 13:00 | 2 | 4 |

→ LDEV ALLOCATED TO RAID GROUP 5-2

UTILIZATION RATES (%) OF LDEV FOR EACH COLLECTION TIME

↓ PERFORMANCE DATA COLLECTION TIMES

[Fig. 7C]

EXAMPLE OF ACQUIRED PERFORMANCE DATA 700

NAME OF LDEV PERFORMANCE DATA COLLECTION FILE FOR RAID GROUP 6-2
PERFORMANCE DATA COLLECTION STORAGE
PERFORMANCE DATA COLLECTION TIMES
PERFORMANCE DATA COLLECTION INTERVAL

LDEV ALLOCATED TO RAID GROUP 6-2: 0:30:01, 0:30:02

| No. | time | 0:30:01 | 0:30:02 |
|---|---|---|---|
| 1 | 2007/6/1 10:00 | 5 | 4 |
| 2 | 2007/6/1 10:15 | 7 | 5 |
| 3 | 2007/6/1 10:30 | 9 | 6 |
| 4 | 2007/6/1 10:45 | 4 | 4 |
| 5 | 2007/6/1 11:00 | 4 | 3 |
| 6 | 2007/6/1 11:15 | 3 | 2 |
| 7 | 2007/6/1 11:30 | 4 | 3 |
| 8 | 2007/6/1 11:45 | 3 | 3 |
| 9 | 2007/6/1 12:00 | 4 | 5 |
| 10 | 2007/6/1 12:15 | 3 | 4 |
| 11 | 2007/6/1 12:30 | 4 | 7 |
| 12 | 2007/6/1 12:45 | 4 | 8 |
| 13 | 2007/6/1 13:00 | 2 | 9 |

UTILIZATION RATES (%) OF LDEV FOR EACH COLLECTION TIME

↓ PERFORMANCE DATA COLLECTION TIMES

[Fig. 7D]

EXAMPLE OF ACQUIRED PERFORMANCE DATA 700

NAME OF RAID GROUP PERFORMANCE DATA COLLECTION FILE
PERFORMANCE DATA COLLECTION STORAGE
PERFORMANCE DATA COLLECTION TIMES
PERFORMANCE DATA COLLECTION INTERVAL

RAID GROUP NUMBERS: 5-1, 5-2, 6-2

| No. | time | 5-1 | 5-2 | 6-2 |
|---|---|---|---|---|
| 1 | 2007/6/1 10:00 | 49 | 7 | 9 |
| 2 | 2007/6/1 10:15 | 47 | 12 | 12 |
| 3 | 2007/6/1 10:30 | 53 | 15 | 15 |
| 4 | 2007/6/1 10:45 | 11 | 12 | 8 |
| 5 | 2007/6/1 11:00 | 14 | 12 | 7 |
| 6 | 2007/6/1 11:15 | 15 | 12 | 5 |
| 7 | 2007/6/1 11:30 | 12 | 13 | 7 |
| 8 | 2007/6/1 11:45 | 16 | 14 | 6 |
| 9 | 2007/6/1 12:00 | 11 | 12 | 9 |
| 10 | 2007/6/1 12:15 | 12 | 11 | 7 |
| 11 | 2007/6/1 12:30 | 49 | 12 | 11 |
| 12 | 2007/6/1 12:45 | 46 | 13 | 12 |
| 13 | 2007/6/1 13:00 | 52 | 6 | 11 |

UTILIZATION RATES (%) OF EACH RAID GROUP
: UTILIZATION RATE OF RAID GROUP IS SUM OF UTILIZATION RATES OF LEDV FOR EACH COLLECTION TIME

↓ PERFORMANCE DATA COLLECTION TIMES

[Fig. 8]
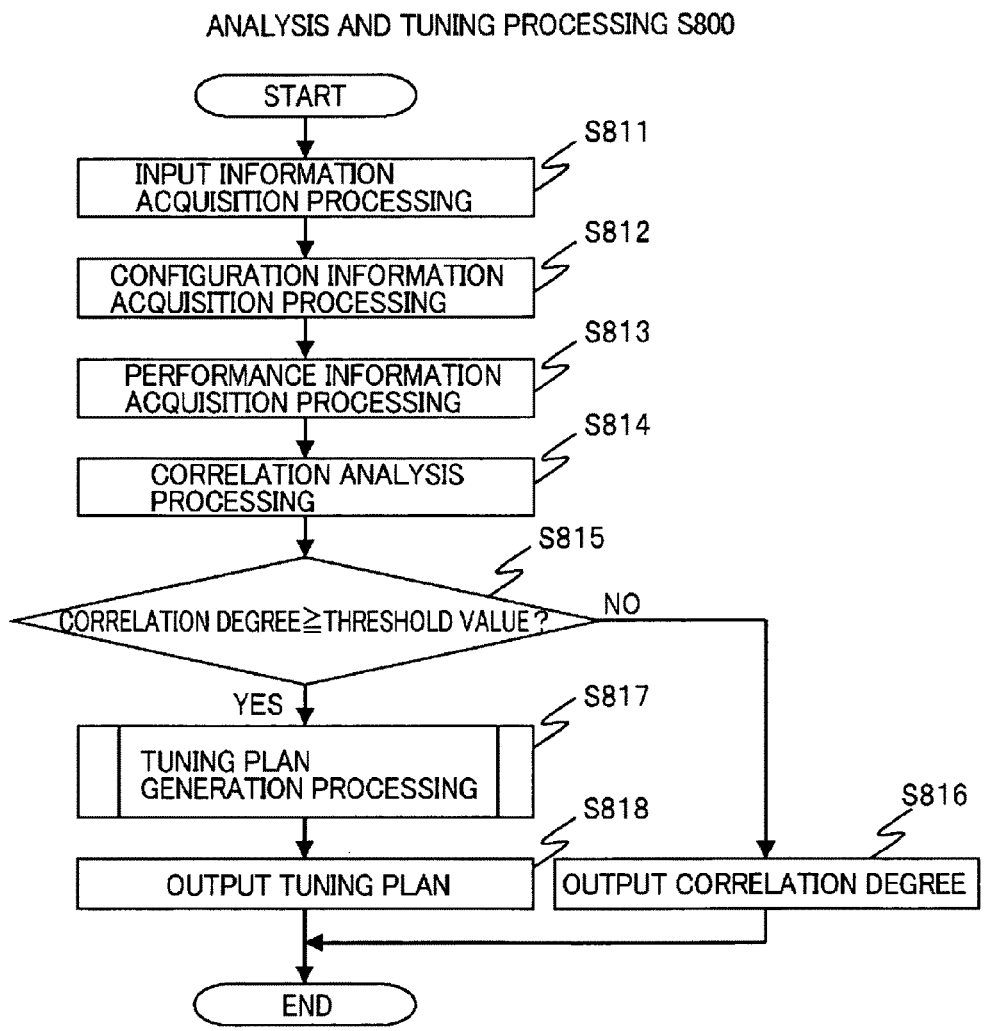

[Fig. 9]

| # | UTILIZATION RATE OF ANALYSIS TARGET | | ANALYSIS WITH CORRELATION ANALYSIS PROGRAM | | DETERMINATION RESULT OF CORRELATION ANALYSIS PROGRAM |
|---|---|---|---|---|---|
| | CHP UTILIZATION RATE | LDEV UTILIZATION RATE | CORRELATION ANALYSIS PROGRAM (LDEV UTILIZATION RATE vs CHP UTILIZATION RATE) | | |
| 1 | (graph) | (graph) | (scatter plot) ⇒ | • CORRELATION COEFFICIENT ($r$)=0.8<br>• VERIFICATION RESULT =SIGNIFICANT | POSITIVE CORRELATION IS STRONG<br>⇒ IT IS DETERMINED THAT TRANSITIONS ARE SIMILAR |
| 2 | (graph) | (graph) | (scatter plot) ⇒ | • CORRELATION COEFFICIENT ($r$)=−0.8<br>• VERIFICATION RESULT =SIGNIFICANT | NEGATIVE CORRELATION IS STRONG<br>⇒ IT IS DETERMINED THAT TRANSITIONS ARE NOT SIMILAR<br># BECAUSE PURPOSE IS TO IDENTIFY RESOURCE CAUSING INCREASE IN UTILIZATION RATE |
| 3 | (graph) | (graph) | (scatter plot) ⇒ | • CORRELATION COEFFICIENT ($r$)=0.2<br>• VERIFICATION RESULT =NOT SIGNIFICANT | CORRELATION IS WEAK<br>⇒ IT IS DETERMINED THAT TRANSITIONS ARE NOT SIMILAR |

[Fig. 10]

EXAMPLE OF CORRELATION ANALYSIS RESULT

| REFERENCE VALUE EXCEEDING RESOURCE NAME | | ANALYSIS TARGET RESOURCE NAME | | | | | | |
|---|---|---|---|---|---|---|---|---|
| | | LEDV 0 | LEDV 1 | LEDV 2 | LEDV 3 | LEDV 4 | LEDV 5 | LEDV 6 | ... |
| | CHP0 | 0.5 | 0.3 | 0.2 | 0.5 | 0.3 | 0.2 | 0.4 | ... |
| | CHP1 | 0.3 | 0.8 | 0.4 | 0.1 | 0.5 | 0.7 | 0.4 | ... |
| | CHP2 | 0.4 | 0.4 | 0.2 | 0.3 | 0.4 | 0.5 | 0.6 | ... |
| | ... | ... | ... | ... | ... | ... | ... | ... | ... |

[Fig. 11]

EXAMPLE OF INPUT INFORMATION OF
TUNING PLAN GENERATION PROCESS

| | | ANALYSIS TARGET RESOURCE NAME | | |
|---|---|---|---|---|
| | | LEDV1 | LDEV5 | ... |
| REFERENCE VALUE EXCEEDING RESOURCE NAME | CHP1 | 0.8 | 0.7 | ... |
| | ... | ... | ... | ... |

[Fig. 12A]
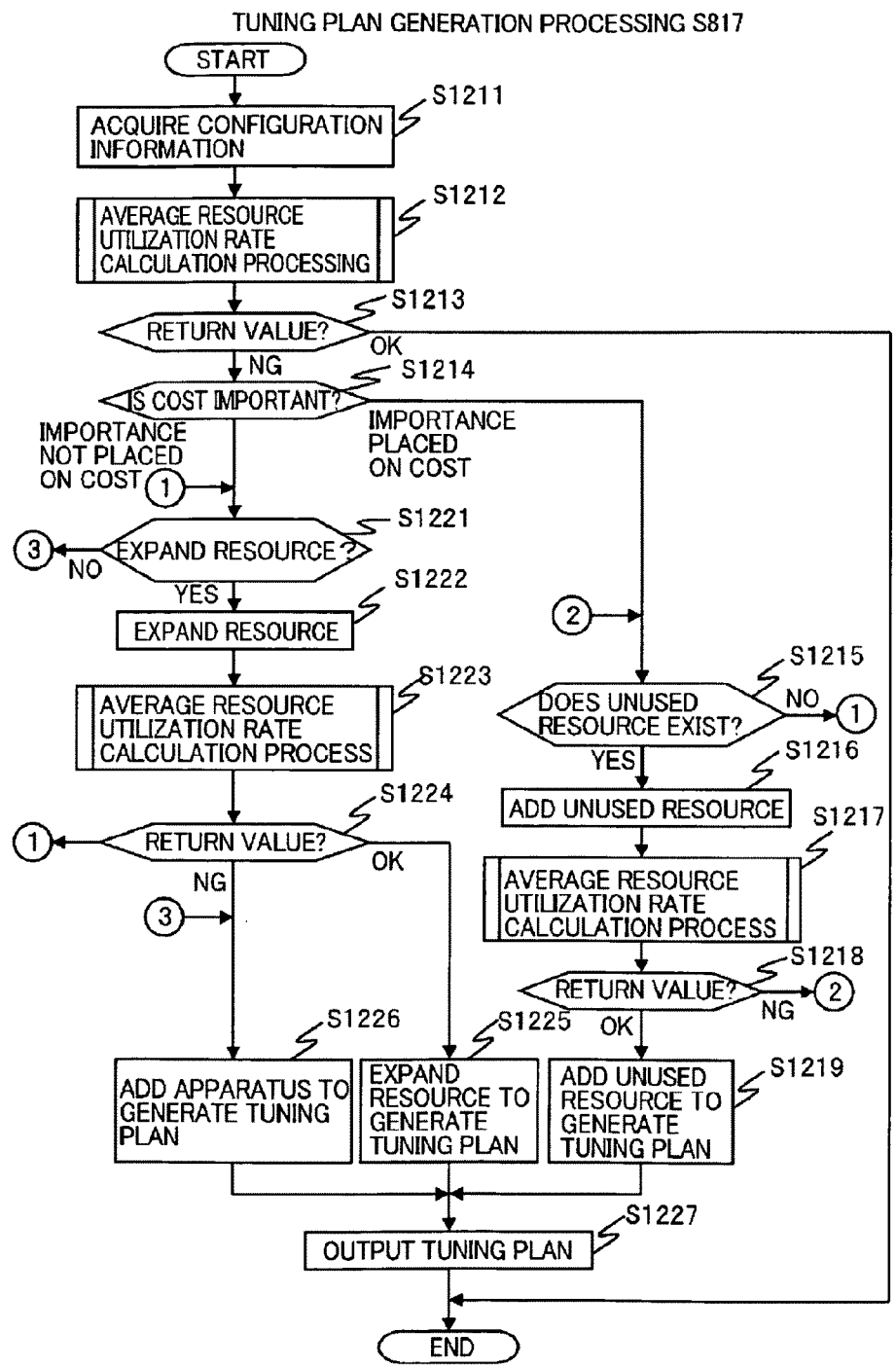

[Fig. 12B]
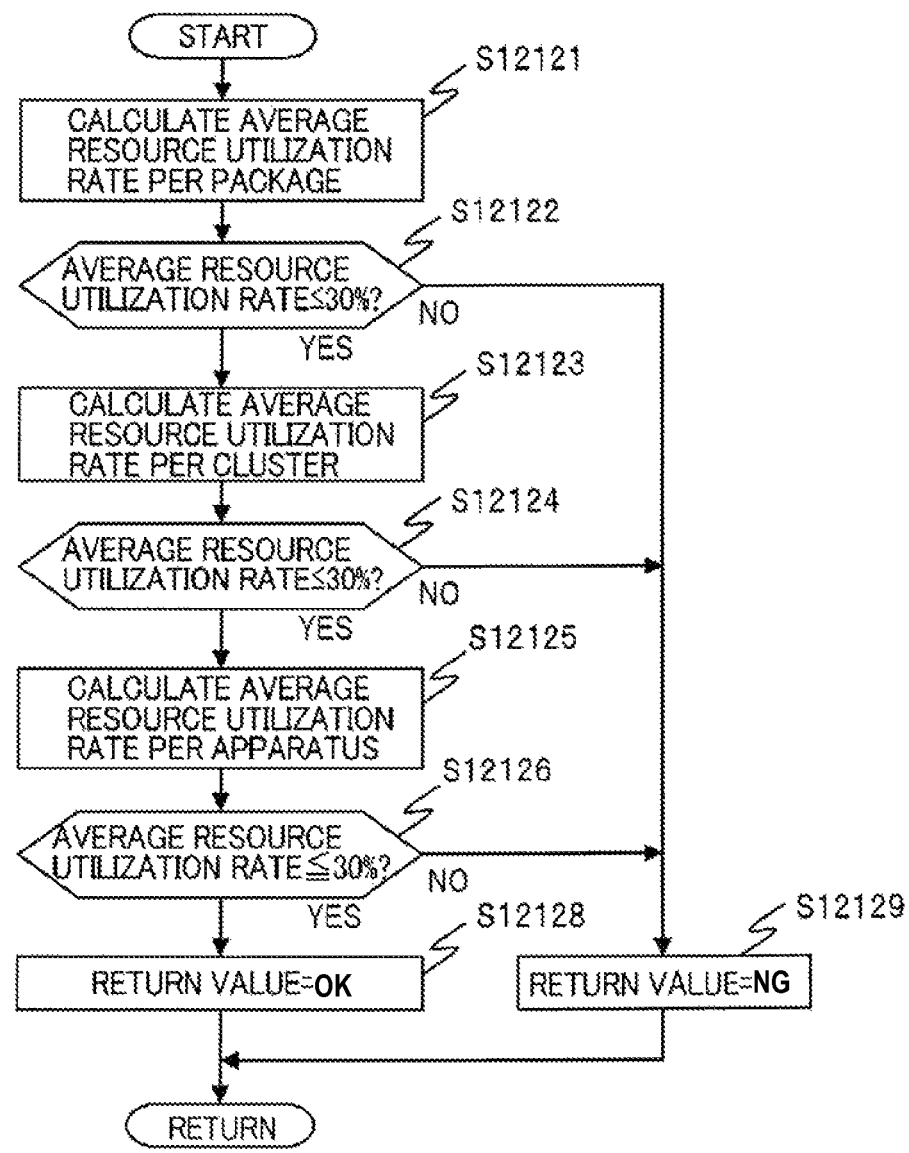

[Fig. 13A]

EXAMPLE OF OUTPUT OF TUNING RESULT

| TUNING METHOD | | | |
|---|---|---|---|
| RESOURCE ADDITION | EXISTING CONFIGURATION | USAGE OF UNUSED RESOURCE | ADDITION OF STORAGE APPARATUS |
|  |  | O |  |

[Fig. 13B]

EXAMPLE OF OUTPUT OF TUNING RESULT

| TUNING RESULT | | |
|---|---|---|
| NAME OF MOVE SOURCE RESOURCE (UPPER FIELD) UTILIZATION RATE (LOWER FIELD) | NAME OF MOVE TARGET RESOURCE (UPPER FIELD) UTILIZATION RATE (LOWER FIELD) | |
| RG5-1 | RG5-2 | RG6-2 |
| 29% | 29% | 29% |

[Fig. 14A]

UTILIZATION RATES BEFORE EXECUTION OF TUNING

LDEV 00:00:02 OF RG 5-1 IS REPLACED WITH UNUSED LDEV BELONGING TO PLURALITY OF RGS (RG 5-2, RG 6-2)

MOVE SOURCE

| Time | RG5-1 | | | |
|---|---|---|---|---|
| | LDEV 00:00:01 | LDEV 00:00:02 | LDEV 00:00:03 | TOTAL |
| 2007/06/01 10:00 | 20 | 24 | 5 | 49 |
| 2007/06/01 10:15 | 22 | 22 | 3 | 47 |
| 2007/06/01 10:30 | 21 | 28 | 4 | 53 |
| ... | . | . | . | . |
| 2007/06/01 12:30 | 22 | 20 | 7 | 49 |
| 2007/06/01 12:45 | 22 | 22 | 2 | 46 |
| 2007/06/01 13:00 | 21 | 26 | 5 | 52 |

MOVE TARGET

| Time | RG5-2 | | | |
|---|---|---|---|---|
| | LDEV 00:10:01 | UNUSED | LDEV 00:10:03 | TOTAL |
| 2007/06/01 10:00 | 3 | | 4 | 7 |
| 2007/06/01 10:15 | 7 | | 5 | 12 |
| 2007/06/01 10:30 | 9 | | 6 | 15 |
| ... | . | | . | . |
| 2007/06/01 12:30 | 4 | | 8 | 12 |
| 2007/06/01 12:45 | 4 | | 9 | 13 |
| 2007/06/01 13:00 | 2 | | 4 | 6 |

MOVE TARGET

| Time | RG6-2 | | | |
|---|---|---|---|---|
| | LDEV 00:30:01 | LDEV 00:30:02 | UNUSED | TOTAL |
| 2007/06/01 10:00 | 5 | 4 | | 9 |
| 2007/06/01 10:15 | 7 | 5 | | 12 |
| 2007/06/01 10:30 | 9 | 6 | | 15 |
| ... | . | . | | . |
| 2007/06/01 12:30 | 4 | 7 | | 11 |
| 2007/06/01 12:45 | 4 | 8 | | 12 |
| 2007/06/01 13:00 | 2 | 9 | | 11 |

UNIT [%]

[Fig. 14B]

UTILIZATION RATES AFTER EXECUTION OF TUNING

MOVE SOURCE

| Time | RG5-1 | | | |
|---|---|---|---|---|
| | LDEV 00:00:01 | UNUSED | LDEV 00:00:03 | TOTAL |
| 2007/06/01 10:00 | 20 | | 5 | 25 |
| 2007/06/01 10:15 | 22 | | 3 | 25 |
| 2007/06/01 10:30 | 21 | | 4 | 25 |
| . | . | | . | . |
| 2007/06/01 12:30 | 22 | | 7 | 29 |
| 2007/06/01 12:45 | 22 | | 2 | 24 |
| 2007/06/01 13:00 | 21 | | 5 | 26 |

MOVE TARGET

| Time | RG5-2 | | | |
|---|---|---|---|---|
| | LDEV 00:10:01 | LDEV 00:00:02 | LDEV 00:10:03 | TOTAL |
| 2007/06/01 10:00 | 3 | 12 | 4 | 19 |
| 2007/06/01 10:15 | 7 | 11 | 5 | 23 |
| 2007/06/01 10:30 | 9 | 14 | 6 | 29 |
| . | . | . | . | . |
| 2007/06/01 12:30 | 4 | 10 | 8 | 22 |
| 2007/06/01 12:45 | 4 | 11 | 9 | 24 |
| 2007/06/01 13:00 | 2 | 13 | 4 | 19 |

MOVE TARGET

| Time | RG6-2 | | |
|---|---|---|---|
| | LDEV 00:30:01 | LDEV 00:30:02 | LDEV0 0:00:02 | TOTAL |
| 2007/06/01 10:00 | 5 | 4 | 12 | 19 |
| 2007/06/01 10:15 | 7 | 5 | 11 | 23 |
| 2007/06/01 10:30 | 9 | 6 | 14 | 29 |
| . | . | . | . | . |
| 2007/06/01 12:30 | 4 | 7 | 10 | 21 |
| 2007/06/01 12:45 | 4 | 8 | 11 | 23 |
| 2007/06/01 13:00 | 2 | 9 | 13 | 24 |

UNIT[%]

[Fig. 15A]

EXAMPLE OF OUTPUT OF TUNING RESULT

| TUNING METHOD | | | |
|---|---|---|---|
| RESOURCE ADDITION | EXISTING CONFIGURATION | USAGE OF UNUSED RESOURCE | ADDITION OF STORAGE APPARATUS |
| ○ | | | |

[Fig. 15B]

EXAMPLE OF OUTPUT OF TUNING RESULT

| TUNING RESULT | | |
|---|---|---|
| NAME OF MOVE SOURCE RESOURCE (UPPER FIELD) UTILIZATION RATE (LOWER FIELD) | NAME OF MOVE TARGET RESOURCE (UPPER FIELD) UTILIZATION RATE (LOWER FIELD) | |
| RG5-1 | RG5-2 | RG6-2 |
| 29% | 14% | 14% |

[Fig. 16A]

UTILIZATION RATES BEFORE EXECUTION OF TUNING

LDEV 00:00:02 OF RG 5-1 IS REPLACED WITH
LDEV BELONGING TO PLURALITY OF RGS
(RG 5-2, RG 6-2) THAT ARE EXPANDED RGS

| | MOVE SOURCE | | | | MOVE TARGET |
|---|---|---|---|---|---|
| | RG5-1 | | | | RG5-2 |
| Time | LDEV 00:00:01 | LDEV 00:00:02 | LDEV 00:00:03 | TOTAL | EXPANDED |
| 2007/06/01 10:00 | 20 | 24 | 5 | 49 | |
| 2007/06/01 10:15 | 22 | 22 | 3 | 47 | |
| 2007/06/01 10:30 | 21 | 28 | 4 | 53 | |
| . | . | . | . | | |
| . | . | . | . | | |
| 2007/06/01 12:30 | 22 | 20 | 7 | 49 | |
| 2007/06/01 12:45 | 22 | 22 | 2 | 46 | |
| 2007/06/01 13:00 | 21 | 26 | 5 | 52 | |

UNIT[%]

| MOVE TARGET |
|---|
| RG6-2 |
| EXPANDED |
| |
| |
| |
| . |
| . |
| |
| |
| |

[Fig. 16B]

UTILIZATION RATES AFTER EXECUTION OF TUNING

| MOVE SOURCE | | | | |
|---|---|---|---|---|
| | RG5-1 | | | |
| Time | LDEV 00:00:01 | UNUSED | LDEV 00:00:03 | TOTAL |
| 2007/06/01 10:00 | 20 | | 5 | 25 |
| 2007/06/01 10:15 | 22 | | 3 | 25 |
| 2007/06/01 10:30 | 21 | | 4 | 25 |
| . | . | | . | |
| . | . | | . | |
| 2007/06/01 12:30 | 22 | | 7 | 29 |
| 2007/06/01 12:45 | 22 | | 2 | 24 |
| 2007/06/01 13:00 | 21 | | 5 | 26 |

| MOVE TARGET | |
|---|---|
| | RG5-2 |
| Time | LDEV 00:00:02 |
| 2007/06/01 10:00 | 12 |
| 2007/06/01 10:15 | 11 |
| 2007/06/01 10:30 | 14 |
| . | . |
| . | . |
| 2007/06/01 12:30 | 10 |
| 2007/06/01 12:45 | 11 |
| 2007/06/01 13:00 | 13 |

| MOVE TARGET | |
|---|---|
| | RG6-2 |
| Time | LDEV 00:00:02 |
| 2007/06/01 10:00 | 12 |
| 2007/06/01 10:15 | 11 |
| 2007/06/01 10:30 | 14 |
| . | . |
| . | . |
| 2007/06/01 12:30 | 10 |
| 2007/06/01 12:45 | 11 |
| 2007/06/01 13:00 | 13 |

UNIT[%]

INFORMATION APPARATUS AND METHOD OF GENERATING TUNING PLAN FOR RESOURCE CONFIGURATION OF STORAGE SYSTEM

TECHNICAL FIELD

The present invention relates to a method of generating a tuning plan for a resource configuration in an information apparatus and a storage system and, more particularly, to a technology for efficiently performing analysis and optimum operation design of a storage system.

BACKGROUND ART

In order to operate a storage system in an optimum and safe manner, it is required to analyze a state of the storage system and perform necessary configuration modifications. With regard to the storage system analysis, for example, Patent Citation 1 describes retrieving and detecting a server group from mapping information between a storage device and a server and narrowing down to only the performance data of the server group to facilitate identification of a server group causing the contention of I/O or a portion acting as a performance bottleneck on a resource in a storage device and preparing a report on I/O contention. Patent Citation 2 describes that a storage administrator monitors performance of a storage device to prevent a performance problem from occurring, as a mechanism of monitoring performance of a storage system.

Patent Citation 1: Japanese Patent Application Laid-Open Publication No. 2005-062941.
Patent Citation 2: Japanese Patent Application Laid-Open Publication No. 2007-233783.

DISCLOSURE OF INVENTION

Technical Problem

The storage system analysis requires to be performed from various viewpoints such as optimum data arrangement to storage resources, power-saving performance, system extendibility, credibility and maintainability of data, and disaster recovery. For example, if there is recognized a reference value being exceeded to cause a bottleneck in a disc drive having a storage system, performance and configuration needs to be analyzed for the related disc drive, communication ports, etc. Performing analysis of the operation state and optimum operation design of a storage system requires advanced skills such as having intimate knowledge of the natures of the resources.

Recently, amounts of data handled in storage systems have increased in organizations in such as business enterprises and storage systems are growing in scale and are becoming more complicated. Therefore, the loads for the analysis and operation design of storage systems have increased and therefore a mechanism is necessary for efficiently and rapidly performing the analysis and optimum operation design of storage systems.

The present invention has been conceived in view of the above background and it is an object thereof to provide a method of generating a tuning plan for a resource configuration in an information apparatus and a storage system capable of efficiently performing analysis and optimum operation design of a storage system.

Technical Solution

An information apparatus that generates a tuning plan on a configuration of resources of a storage system according to an aspect of the present invention for solving the above and other problems comprises a configuration information acquiring unit that acquires configuration information of the resource of the storage system;

a performance data acquiring unit that acquires performance data of a reference value exceeding resource being the resource having a utilization rate exceeding a preset reference value, and performance data of an analysis target resource being the resource having a certain relationship with the reference value exceeding resource;

a correlation degree calculating unit that obtains a correlation degree between the reference value exceeding resource and the analysis target resources based on the performance data of the reference value exceeding resource and the performance data of the analysis target resources; and a tuning plan generating unit that generates a tuning plan for the configuration of the resources of the storage system by selecting a correlated analysis target resource being the analysis target resource determined as having correlation with the reference value exceeding resource from the correlation degree obtained by the correlation degree calculating unit, and by calculating an average resource utilization rate of a resource group in a predetermined range on the basis of the selected correlated analysis target resource such that the average resource utilization rate becomes equal to or less than a predetermined threshold value.

According to the present invention, a correlation degree between a reference value exceeding resource such as resources having a utilization rate exceeding a reference value and the analysis target resource, is automatically obtained based on the con-figuration information and the performance data of the resources. And the analysis target resource correlated with the reference value exceeding resource (analysis target resource having correlation) is automatically selected. Further, an average resource utilization rate is calculated for a resource group in a certain range on the basis of the selected analysis target resource and a tuning plan is automatically generated for the configuration of resources in the storage system in accordance with a policy set in advance such that the average resource utilization rate becomes equal to or less than a certain threshold value. In this way, according to the present invention, processing such as selection of an analysis target resource having correlation and generation of a tuning plan using the average resource utilization rate as a criterion of judgment are automatically performed. Therefore, analysis and optimum operation design may be efficiently performed for large-scaled and complicated storage systems.

In the information apparatus of one aspect of the present invention, the tuning plan generating unit calculates the respective average resource utilization rate for a first resource group including the correlated analysis target resource and a resource of a same type as the correlated analysis target resource having a first relationship with the correlated analysis target resource and a second resource group including the correlated analysis target resource and a resource of the same type as the correlated analysis target resource having a second relationship with the correlated analysis target resource, and generates a tuning plan for a configuration of a resource of a storage system such that an average resource utilization rate calculated for the first resource group becomes equal to or less than a first threshold value set for the first resource group and an average resource utilization rate calculated for the second resource group becomes equal to or less than a second threshold value set for the second resource group.

As described above, the tuning plan generating unit sets a plurality of resource groups varying in type (the first resource group and the second resource group) with the correlated analysis target resource as the basis and generates a tuning plan such that the average resource utilization rates calculated for each of the resource groups set become equal to or less than the threshold values set (the first threshold value and the second threshold value), respectively. According to the present invention, since different types of resource groups are set and the average resource utilization rates are determined to design the tuning plan as above, a more preferable and safe tuning plan may be generated.

The first relationship and the second relationship include, for example, a relationship that the resources are of the same type as the correlated analysis target resource that are accessed by the reference value exceeding resource, a relationship that the resources configure a correlated analysis target resource and a fail over cluster, and a relationship that the resources belong to the same storage apparatus as the correlated analysis target resource.

The above mentioned configuration information includes, for example, information that identifies the analysis target resources accessed by the reference value exceeding resource. And the performance data includes the utilization rates of the resources.

The certain relationship mentioned above between the reference value exceeding resource and the analysis target resource is, for example, a relationship that the analysis target resource is accessed by the reference value exceeding resource.

The tuning plan generating unit acquires a policy that instructs a method of generating a tuning plan to generate the tuning plan in accordance with the acquired policy.

In this way, since the tuning plan is generated in accordance with a policy (e.g., place importance on cost/importance on cost not considered), the optimum tuning plan may be generated in accordance with user's requests, operational conditions required for the storage system and the like.

For example, if the policy is specified to place importance on cost, the tuning plan generating unit generates a tuning plan with priority given to adding an unused resource acquired from the configuration information, if and the policy is specified to not consider importance on cost, the tuning plan generating unit generates a tuning plan based on the premise that a new resource is added.

Even if the policy is specified to place importance on cost, if the average resource utilization rate cannot be made equal to or less than a predetermined threshold value regardless of an addition of an unused resource, the tuning plan generating unit generates a tuning plan based on the premise that a new resource is added.

The storage system to be analyzed includes, for example, a storage apparatus having a channel control unit that communicates with a host computer, a disc control unit that accesses a storage device in accordance with I/O commands sent from the channel control unit, and a cache memory accessed by the channel control unit and the disc control unit. In this case, the resource to be analyzed is the channel control unit, the disc control unit, the cache memory, a logical device (LDEV) provided by the storage device and others.

If the reference value exceeding resource is the channel control unit, the analysis target resource is the logical device (LDEV) accessed by the channel control unit, and the tuning plan includes details on modifications of the logical device to be accessed by the channel control unit.

Other problems disclosed by the application and the solutions thereof are made apparent in the section of the embodiment of the invention and the drawings attached.

Advantageous Effects

According to the present invention, an analysis and an optimum operation design may efficiently be performed for storage systems.

BRIEF DESCRIPTION OF THE DRAWINGS

FIG. 1 is a diagram showing a schematic configuration of an information processing system 1.

FIG. 2 is an example of a computer usable as an information apparatus 2, and the like.

FIG. 3A is a diagram showing an example of a storage system 5 to be analyzed.

FIG. 3B is a diagram showing an example of a hardware configuration of CHP 11.

FIG. 3C is a diagram showing an example of a hardware configuration of DKP 12.

FIG. 4 is a diagram showing main functions included in information apparatus 10.

FIG. 5 is a diagram showing an example of input information 500.

FIG. 6 is a diagram showing an example of configuration information 600.

FIG. 7A is a diagram showing an example of acquired performance data 700.

FIG. 7B is a diagram showing an example of the acquired performance data 700

FIG. 7C is a diagram showing an example of the acquired performance data 700

FIG. 7D is a diagram showing an example of the acquired performance data 700

FIG. 8 is a flowchart for explaining an analysis and tuning processing S800.

FIG. 9 is a diagram for explaining a method of calculating a correlation degree by a correlation degree calculating unit 414.

FIG. 10 is a diagram showing an example of an output result of a correlation analysis processing S814.

FIG. 11 is a diagram showing an example of input information of a tuning plan generation processing S817.

FIG. 12A is a flowchart for explaining the tuning plan generation processing S817.

FIG. 12B is a flowchart for explaining an average resource utilization rate calculation processing S1212.

FIG. 13A is a diagram showing an example of a tuning result that is output.

FIG. 13B is a diagram showing an example of a tuning result that is output.

FIG. 14A is a diagram showing how the resource utilization rates change before and after execution of tuning.

FIG. 14B is a diagram showing how the resource utilization rates change before and after execution of tuning.

FIG. 15A is a diagram showing an example of a tuning result that is output.

FIG. 15B is a diagram showing an example of a tuning result that is output.

FIG. 16A is a diagram showing how the resource utilization rates change before and after execution of tuning.

FIG. 16B is a diagram showing how the resource utilization rates change before and after execution of tuning.

EMBODIMENTS OF INVENTION

Embodiments will be described below. FIG. 1 depicts, for explaining as an embodiment, a schematic configuration of an information processing system 1 that performs analysis (assessment) of a configuration and an operation status (performance data (such as resource utilization rate and I/O loads)) of resources that configure a storage system and that generates a tuning plan based on the above mentioned analysis.

As shown in FIG. 1, this information processing system 1 includes an information apparatus 2 and a database server 4 coupled to the information apparatus 2 through a communication network 3 such as LAN (Local Area Network). The above mentioned database server 4 includes a database functioning to manage information relating to a configuration of resources of a storage system to be analyzed (hereinafter referred to as configuration information) and information relating to performance of resources (hereinafter referred to as performance data).

The information processing system of FIG. 1 is set in a business office or the like of a service provider such as a storage vender that offers services of analyzing a storage system and providing a tuning plan as requested from a user (customer) of the storage system, for example. The configuration information and the performance data of a storage system to be analyzed and tuned stored in the database 41 are acquired and registered by the storage vender providing or operating the storage system from, for example, a user, an operator of the storage system, and the like.

FIG. 2 depicts an example of a hardware configuration of a computer 20 usable as the information apparatus 2 or the database server 4. As shown in FIG. 2, this computer 20 includes a CPU 21, a volatile or nonvolatile memory 22 (RAM or ROM), a storage device 23, (e.g., a hard disc drive, a semiconductor memory (SSD (Solid State Drive))), an input device 24 such as a keyboard or a mouse, a liquid crystal monitor or a CRT display, an output device 25 such as a printer, and a communication interface 26 such as NIC (Network Interface Card or HBA (Host Bus Adaptor).

=Storage System=

FIG. 3A depicts an example of a storage system to be analyzed by the information processing system 1 in the above service. As shown in FIG. 3A, the storage system 5 includes one or more host computers 6, one or more storage apparatuses 10 coupled to the host computers 6 through a communication network 7 such as LAN or SAN (Storage Area Network), and a management server 8 coupled to the host computers 6 and the storage apparatuses 10 through the communication network 7. Further, the management server 8 may be coupled to the host computers 6 and the storage apparatuses 10 through another communicating means different from the communication network 7.

As shown in FIG. 3A, the storage apparatus 10 includes one or more channel control units (hereinafter referred to as CHP 11 (Channel Controller Package)), one or more disc control units (hereinafter referred to as DKP 12 (Disc Controller Package)), a cache memory (hereinafter referred to as CM 13), a shared memory (hereinafter referred to as SM 14), a storage device 15, an internal network 16 configured with crossover switches and the like, and an SVP 17 (SVP: Service Processor).

Resources to be analyzed by the information processing system 1 or to resources subject to configuration design when generating a tuning plan, include the storage apparatus 10, the CHP 11, the DKP 12, the CM 13, a hard disc drive 151, LDEV 152, a RAID group, and the like.

The CHP 11 of FIG. 3A receives I/O requests sent from the host computer 6 and transmits I/O commands (data read command and data write command) to the DKP 12. Delivery of data (data read from the storage device 15 and data written into the storage device 15) between the CHP 11 and the DKP 12 when processing the I/O commands are normally performed through the CM 13. When the I/O requests are executed, responses (such as read data, a read completion report, and a write completion report) are transmitted from the CHP 11 to the host computer 6.

FIG. 3B depicts an example of a hardware configuration of the CHP 11. As shown in FIG. 3B, the CHP 11 includes a processor (hereinafter referred to as MP 111), a local memory (hereinafter referred to as LM 112), an external communication interface 113, and an internal communication interface 114.

The MP 111 mainly executes processing related to transmission/reception of data to/from external apparatuses (the host computers 6), such as protocol control. The MP 111 is configured with a CPU (Central Processing Unit), MPU (Micro Processing Unit), and DMA, for example.

The LM 112 stores programs executed by the MP 111 and data referenced by the MP 111. The LM 112 is configured with the use of a RAM (Random Access Memory) or a ROM (Read Only Memory), for example.

The external communication interface 113 communicates with the host computers 6 in conformity to a communication standard such as Ethernet (registered trademark) or Fiber Channel. For example, the interface is configured with a MC or HBA. The internal communication interface 114 communicates with the DKP 12, the CM 13, and the SM 14 through the internal network 16.

The DKP 12 accesses the storage device 15 in accordance with the I/O commands sent from CHP 11. For example, the DKP 12 reads data from the storage device 15 and writes data into the storage device 15. Additionally, the DKP 12 performs staging (reading of data from the storage device 15) and the destaging (writing into the storage device 15) of data stored in the CM 13 whenever necessary.

FIG. 3C depicts an example of a hardware configuration of the DKP 12. As shown in FIG. 3C, the DKP 12 includes a processor (hereinafter, MP 121), a local memory (hereinafter, LM 122), an internal communication interface 123, and a storage device interface 124.

The MP 121 mainly executes processes related to transmission/reception of data to/from the CHP 11, the CM 13, the SM 14, and the storage device 15. The MP 121 is configured with a CPU, MPU, and DMA, for example.

The LM 122 stores programs executed by the MP 121 and data referenced by the MP 121, for example. The LM 122 is configured with the use of a RAM or a ROM.

The internal communication interface 123 communicates with the CHP 11, the CM 13, and the SM 14 through the internal network 16.

The storage device interface 124 communicates with the storage device 15 through a fiber channel loop, for example.

The CM 13 is configured with the use of a RAM capable of high-speed access, for example. The CM 13 stores (performs the staging of) data written into the storage device 15 (hereinafter, write data) or data read from the storage device 15 (hereinafter, read data). The SM 14 stores information used for controlling the storage apparatus 10, for example.

The storage device 15 is configured to include a hard disc drive (disc drive) and a solid state drive (SSD), for example. In the present embodiment, the storage device 15 is configured with the use of a plurality of the hard disc drives 151, and the hard disc drives are controlled in conformity to the RAID (Redundant Arrays of Inexpensive (or Independent) Disks) control mode (e.g., RAID level 5, 6). The storage device 15 provides a storage area on the basis of logical devices (hereinafter referred to as LDEV 152 (LDEV: Logical Device)) configured with the use of storage areas provided by RAID (e.g., storage areas of a RAID group (parity group (PG))).

The SVP 17 is coupled to the management server 8 through the internal network 16 or another form of network. The SVP 17 provides configuration information and performance data of the storage apparatus 10 to the management server 8 in accordance with requests from the management server 8.

The host computer 6 transmits I/O requests to the storage apparatus 10, for example, on the basis of blocks or files. The communication between the host computer 6 and the storage apparatus 10 is performed in conformity to protocols such as TCP/IP, FICON (registered trademark) (Fiber Connection), ESCON (registered trademark) (Enterprise System Connection), ACONARC (registered trademark) (Advanced Connection Architecture), and FIBARC (registered trademark) (Fiber Connection Architecture), for example. The host computer 6 has a hardware configuration shown in FIG. 2, for example.

The management server 8 includes an user interface such as GUI (Graphical User Interface), CLI (Command Line Interface), and the like. The management server 8 communicates with, for example, the SVP 17 of the storage apparatus 10 to acquire and store the configuration information and the performance data of the storage apparatus 10. The management server 8 has a hardware configuration shown in FIG. 2, for example, and the function of the management server 8 is implemented by executing the programs stored in the memory 22 with the CPU 21.

=Functions of Information Apparatus=

FIG. 4 depicts main functions of the information apparatus 2 for the analysis of the storage system 5 and the generation of a tuning plan. As shown in FIG. 4, the in-formation apparatus 2 includes an input information acquiring unit 411, a configuration information acquiring unit 412, a performance data acquiring unit 413, a correlation degree calculating unit 414 (a correlation coefficient calculating unit 4141, an de-correlation verifying unit 4142, and a correlation determining unit 4143), and a tuning plan generating unit 415. These functions are implemented by executing the programs stored in the memory 22 with the CPU 21.

The input information acquiring unit 411 acquires input information necessary for analyzing the storage system 5. The input information acquiring unit 411 acquires the input information through a user interface configured with the use of the input device 24 and the output device 25, for example.

The configuration information acquiring unit 412 accesses the database 41 of the database server 4 to acquire the configuration information of the storage system 5 to be analyzed.

The performance data acquiring unit 413 accesses the database 41 of the database server 4 to acquire the performance data of the storage system 5 to be analyzed.

The correlation degree calculating unit 414 uses the input information acquired by the input information acquiring unit 411, the configuration information acquired by the configuration information acquiring unit 412, and the performance data acquired by the performance data acquiring unit 413 to obtain a correlation degree between a reference value exceeding resource described later and an analysis target resource described later. As shown in FIG. 4, the correlation degree calculating unit 414 includes the correlation coefficient calculating unit 4141, the de-correlation verifying unit 4142, and the correlation determining unit 4123.

The tuning plan generating unit 415 generates a tuning plan for a configuration including the analysis target resource.

=Input Information=

FIG. 5 depicts an example of the input information (data format) acquired by the input information acquiring unit 411. As shown in FIG. 5, input information 500 includes items to be set, namely, a customer name 511, examination date 512, a reference value exceeding resource information 513, an analysis target resource in-formation 514, a cost classification 515, and an analysis period 516.

Of the above, in the customer name 511, a name of a customer who has made a request to the storage vender to analyze the storage system 5 is set. The date of examination 512 is set with the date when the configuration information and the performance data used for the analysis were acquired.

In the reference value exceeding resource information 513, a reference value exceeding resource type 5131 and a reference value exceeding resource name 5132 are set. The reference value exceeding resource is a resource that is set a utilization rate comprehended from the performance data acquired from the storage system 5 exceeding a preset reference rate. The aforementioned utilization rate is, for example, an average utilization rate of the LDEV 152 accessed by a certain CHP 11. And if, for example, this average utilization rate exceeds the reference value, the CHP 11 is defined as a reference value exceeding resource. The reference value is determined by, for example, a user of the storage system, the designer of the storage system, a service provider such as a storage vender, and the like. The reference value may be a predetermined fixed value or may arbitrarily set depending on a usage pattern of the storage system 5. Whether a certain resource is a reference value exceeding resource or not is determined by the service provider referring to the performance data of the resource, for example.

In the analysis target resource information 514, an analysis target resource type 5141 and an analysis target resource name 5142 are set. Note that the analysis target resource is a resource to be analyzed in connection with the reference value exceeding resource.

In the cost classification 515, information indicative of whether importance is placed on cost at the time of tuning (cost is minimized) or importance on cost is not considered (cost is not particularly considered) is set. If importance is placed on cost, "cost oriented" is set in the cost classification 515, and if importance on cost is not considered, "cost not considered" is set in the cost classification 515. If "cost oriented" is set, the tuning plan generating unit 415 generates a tuning plan with priority given to usage of resources not in use. On the other hand, if "cost not considered" is set, the tuning plan generating unit 415 generates a tuning plan on the premise that resources or storage apparatuses 10 are added.

In this way, when a tuning plan is generated, users and service providers may freely set in advance the above mentioned cost classifications or various policies such as giving priority to processing performance (processing time), for example.

In the analysis period 516, a period when analysis is performed (analysis start time 5161 and analysis end time 5162) is set.

=Configuration Information=

FIG. 6 depicts an example of configuration information acquired by the configuration information acquiring unit 412. Configuration information 600 includes, for example, information 611 relating to the storage apparatuses 10 (locations of the storage apparatuses 10 (such as physical locations and coupling positions of the storage apparatuses 10 on a network), the total number of the storage apparatuses 10 configuring the storage system 5, and whether or not each of the storage apparatuses 10 is currently in use (at the time of acquisition of configuration information)), information 612 relating to the CHPs 11 (location of the CHPs 11 (such as identifiers of the storage apparatuses 10 the CHPs belong to and port numbers), the number of CHPs 11 included in the storage apparatuses 10, information indicative of physical paths or logical paths passing through the CHPs 11, classification indicative of whether the CHPs currently are in use or not in use), information 613 relating to the DKPs 12 (location of the DKPs 12 (such as identifiers of the storage apparatuses 10 the DKPs belong to and port numbers), the number of the DKPs 12 included in the storage apparatuses 10, in-formation indicative of physical paths or logical paths passing through the DKPs 12, classification indicative of whether the DKPs are currently in use or not), information 614 relating to the CM 13 (such as total capacity and amount currently used), in-formation 615 relating to the SM 14 (such as total capacity and amount currently used), information 616 relating to the LDEVs 152 (locations of the LDEVs 152 (such as identifiers of the storage apparatuses 10 the LDEVs belong to), total capacity, performance, amount currently used, identifiers of the RAID groups or the hard disc drives 151 providing the LDEVs 152, and performance of the LDEVs 152), in-formation 617 relating to the RAID groups (locations of the RAID groups, types of RAID (such as RAID-5 and RAID-6), identifiers of the constituent hard disc drives 151), information 618 relating to the hard disc drives 151 (such as capacities, performance, and types), and information 619 relating to I/O paths (physical paths or logical paths) (definition information of I/O paths (such as communication ports of the host computers 6, communication ports of network switches between the host computers and the storage apparatuses 10, communication ports of the CHPs 11, identifier of logical volume (LU: Logical Unit), and combinations of identifiers of the LDEVs)). Additionally, the configuration information 600 includes information necessary for identifying the analysis target resources to be accessed by the reference value exceeding resources.

The configuration information 600 acquired and stored by the management server 8 is sent to the service provider through a recording medium or a communication network, for example. The service provider registers the received performance data 700 into the database 41.

=Performance Data=

The performance data acquired by the performance data acquiring unit 413 includes utilization rates of the resources configuring the storage system 5, for example. The performance data includes, for example, utilization rates of the CHPs 11, utilization rates of the DKPs 12, utilization rates of the LDEVs 152, utilization rates of the RAID groups, utilization rates of the I/O paths (physical paths or logical paths), and data transfer rate per unit time of the I/O paths. The utilization rate is a value comprehended as an average of utilization rates per unit time, for example. The performance data includes access frequencies of the CMS 13 and access frequencies of each of the SMs 14.

The performance data may automatically be acquired, for example, in a data center or the like provided with the storage system 5, by giving acquisition instructions specifying acquisition conditions of the performance data to the management server 8 to access the constituent elements such as the storage apparatuses 10 of the storage system 5 with the management server 8.

FIGS. 7A to 7D depict examples of performance data 700 acquired with the used of the management server 8. FIGS. 7A to 7C depict an example of utilization rates of the LDEVs 152 acquired from the storage apparatus 10 and FIG. 7D is an example of utilization rates of RAID groups acquired. In either case, the acquisition instruction to the management server 8 is given with acquisition condition specified by a name of a file for recording the performance data 700, an identifier (serial number) and a type of the target storage apparatus 10, period of acquiring the performance data 700, and acquisition interval.

The performance data 700 acquired by the management server 8 is delivered to the service provider from a user through a recording medium, a communication network and the like. The service provider registers the sent performance data 700 into the database 41 as necessary.

=Description of Processing=

FIG. 8 is a flowchart for explaining a schematic processing executed by the in-formation apparatus 2 at the time of the analysis of the storage system 5 and the generation of a tuning plan. The processing executed by the information apparatus 2 (referred to as an analysis and tuning processing S800) will hereinafter be described with reference to FIG. 8. The character "S" added to the head of the reference numerals stands for step in the following description.

As shown in FIG. 8, the input information acquiring unit 411 acquires input in-formation 500 (input information acquisition processing S811).

Then, the configuration information acquiring unit 412 accesses the database server 4 to acquire the configuration information 600 (configuration information acquisition processing S812).

Subsequently, the performance data acquiring unit 413 accesses the database server 4 to acquire the performance data 700 (performance data acquisition processing S813).

The correlation degree calculating unit 414 then uses the input information 500 acquired in the input information acquisition process S811, the configuration in-formation 600 acquired in the configuration information acquisition process S812, and the performance data 700 acquired in the performance data acquisition process S813 to perform correlation analysis between the reference value exceeding resource and the analysis target resource (correlation analysis processing S814).

In the correlation analysis processing S814, first, the correlation coefficient calculating unit 4141 obtains a correlation coefficient between the performance data of the reference value exceeding resource and the performance data of the analysis target resource. The above mentioned coefficient is a Pearson product-moment correlation coefficient, for example.

Next, the de-correlation verifying unit 4142 performs de-correlation verification to verify the significance of the correlation coefficient (whether or not the correlation co-efficient is greater than a threshold value). Then the correlation determining unit 4143 determines whether or not the reference value exceeding resource and the analysis target resource have similar tendency (shift) in performance variations (whether the resources are correlated) based on the correlation coefficient obtained by the correlation efficient calculating unit 4141 and the result of the de-correlation verification by the de-correlation verifying unit 4142.

FIG. 9 depicts a method of calculating a correlation degree by the correlation degree calculating unit 414. A threshold value used for determining the significance is set to "0.7" in all the cases shown in FIG. 9.

In case "#1" of FIG. 9, positive correlation exists between the utilization rate of the reference value exceeding resource (the utilization rate of the CHP that is the reference value exceeding resource) and the utilization rate of the analysis target resource (the utilization rate of the LDEV that is the analysis target resource). In this case, the correlation coefficient calculating unit 4141 obtains a correlation coefficient (r) of "0.8"; the de-correlation verifying unit 4142 verifies that the correlation coefficient (r) is "significant"; and the correlation determining unit 4143 determines that "positive correlation is strong (the utilization rate of the reference value exceeding resource and the utilization rate of the analysis target resource shift similarly (variation tendency))".

In case "#2", negative correlation exists between the utilization rate of the reference value exceeding resource (the utilization rate of the CHP that is the reference value exceeding resource) and the utilization rate of the analysis target resource (the utilization rate of the LDEV that is the analysis target resource). In this case, the correlation coefficient calculating unit 4141 obtains a correlation coefficient (r) of "−0.8"; the de-correlation verifying unit 4142 verifies that the correlation coefficient (r) is "significant"; and the correlation determining unit 4143 determines that "negative correlation is strong (the utilization rate of the reference value exceeding resource and the utilization rate of the analysis target resource do not shift similarly (variation tendency))".

In case "#3", weak correlation exists between the utilization rate of the reference value exceeding resource (the utilization rate of the CHP that is the reference value exceeding resource) and the utilization rate of the analysis target resource (the utilization rate of the LDEV that is the analysis target resource). In this case, the correlation coefficient calculating unit 4141 obtains a correlation coefficient (r) of "0.2"; the de-correlation verifying unit 4142 verifies that the correlation coefficient (r) is "not significant"; and the correlation determining unit 4143 determines that "correlation is weak (the utilization rate of the reference value exceeding resource and the utilization rate of the analysis target resource do not shift similarly (variation tendency))".

After the correlation analysis processing S814, the information apparatus 2 determines whether or not the correlation degree is high (whether or not the correlation degree is greater than a threshold value) (S815).

FIG. 10 depicts an example of an output result of the above mentioned correlation analysis processing S814. FIG. 10 depicts an output result when a plurality of CHPs 11 (CHP0, CHP1, CHP2, . . . ) are given as the reference value exceeding resources and a plurality of LDEVs 152 (LDEV0, LDEV1, LDEV2, . . . ) are given as the analysis target resources, and the results show that combinations of CHP 1 and LDEV 1, and CHP 1 and LDEV 5 indicates strong positive correlation.

If a combination of the reference value exceeding resource and the analysis target resource is determined as having a low correlation degree (S815: NO), the information apparatus 2 outputs the correlation degree obtained for the combination to the output device 25 and terminates the processing (S816).

On the other hand, if a combination of the reference value exceeding resource and the analysis target resource is determined as having a high correlation degree (S815: YES), a tuning plan generation processing is executed (S817).

FIG. 11 depicts information applied as input to a processing of S817 (referred to as a tuning plan generation processing 5817) when executing the tuning plan generation processing S817 corresponding to the output result shown in FIG. 10. As shown in FIG. 11, the above combinations determined as having strong positive correlation (CHP1 and LDEV1, and CHP1 and LDEV5) are delivered to the tuning plan generating unit 415.

FIG. 12A is a flowchart for explaining the tuning plan generation processing S817. The tuning plan generation processing will hereinafter be described with reference to FIG. 12A. The processing of FIG. 12A is executed for each analysis target resource applied as input.

First the tuning plan generating unit 415 acquires configuration information necessary for the subsequent processing from the database 41 (S1211).

At S1212, the tuning plan generating unit 415 executes an average resource utilization rate calculation processing.

FIG. 12B is a flowchart for explaining details of the average resource utilization rate calculation processing S1212. The average resource utilization rate calculation processing S1212 will hereinafter be described with reference to FIG. 12B.

The tuning plan generating unit 415 first obtains an average utilization rate (average resource utilization rate) for a resource group (hereinafter referred to as first resource group) consisting of resources of the same type as the analysis target resource in a small range (in units of packages in FIG. 12B) on the basis of the analysis target resource applied as input (the correlated analysis target resource) (S12121).

The first resource group is a group (collection) consisting of, for example, the analysis target resource applied as input (the correlated analysis target resource) and resources of the same type as the analysis target resource utilized (accessed) by the reference value exceeding resource applied as input. For example, if the reference value exceeding resource is the CHP 11 and the analysis target resource is the LDEV 152, the above mentioned first resource group includes all the LDEVs 152 accessed by the CHP 11 as elements.

At S12122, the tuning plan generating unit 415 determines whether or not the average resource utilization rate obtained at S12121 is not greater than a predetermined threshold value (e.g., 30%). If the rate is not greater than the threshold value (S12122: YES), the process goes to step S12123, and if the rate is greater than the threshold value (S12122: NO), the process goes to step S12129.

At S12123, the tuning plan generating unit 415 obtains an average utilization rate (average resource utilization rate) for a resource group (hereinafter referred to as second resource group) consisting of resources of the same type as the analysis target resource in a medium range (in units of clusters in FIG. 12B) on the basis of the analysis target resource applied as input (the correlated analysis target resource).

The second resource group is a group (collection) consisting of, for example, the analysis target resource applied as input and resources of the same type as the relevant analysis target resource having a certain relationship with the relevant analysis target resource (the correlated analysis target resource). For example, if the reference value exceeding resource is the CHP 11 and the analysis target resource is the LDEV 152, the above mentioned second resource group includes, as elements, all the LDEVs 152 accessed by the relevant CHP 11, and all the LDEVs 152 accessed by other CHPs 11 that belong to the storage apparatus 10 to which the relevant CHP 11 belongs to and that configure a fail over cluster with the relevant CHP 11.

At S12124, the tuning plan generating unit 415 determines whether or not the average resource utilization rate obtained at S12123 is not greater than a predetermined threshold value (e.g., 30%). If the rate is not greater than the threshold value (S12124: YES), the process goes to step S12125, and if the rate is greater than the threshold value (S12124: NO), the process goes to step S12129.

At S12125, the tuning plan generating unit 415 obtains an average utilization rate (average resource utilization rate) for a resource group (hereinafter referred to as third resource group) consisting of resources of the same type as the analysis target resource in a large range (in units of storage apparatuses 10 in FIG. 12B) on the basis of the analysis target resource applied as input.

The above mentioned third resource group is a group (collection) consisting of, for example, the analysis target resource applied as input and resources of the same type as the relevant analysis target resource having a certain relationship with the relevant analysis target resource (the correlated analysis target resource). For example, if the reference value exceeding resource is the CHP 11 and the analysis target resource is the LDEV 152, the above mentioned third resource group includes, as elements, all the LDEVs 152 included in the storage apparatus 10 to which the CHP 11 belongs.

At S12126, the tuning plan generating unit 415 determines whether or not the average resource utilization rate obtained at S12125 is not greater than a predetermined threshold value (e.g., 30%). If the rate is not greater than the threshold value (S12126: YES), the process goes to step S12128, and if the rate is greater than the threshold value (S12126: NO), the process goes to step S12129.

At S12128, the tuning plan generating unit 415 sets "OK" for a return value of the relevant average resource utilization rate calculation processing S1212. At S12129, the tuning plan generating unit 415 sets "NG" for a return value of the relevant average resource utilization rate calculation processing S1212.

When the average resource utilization rate calculation processing S1212 is executed as above, if the average resource utilization rate obtained for at least one resource group among the first to third resource groups is greater than a predetermined threshold value, "NG" is set for the return value to indicate a state requiring tuning, and if all the average resource utilization rates for the first to third resource groups are not greater than a predetermined threshold value, "OK" is set for the return value to indicate that tuning is not particularly necessary.

Incidentally, the small, medium, and large ranges in the above processing are set such that a relationship of the number of elements of the resource groups is, as a general rule; the number of element of the first resource group<the number of elements of the second resource group<the number of elements of the third resource group. In the present embodiment, although the average resource utilization rates are determined for three ranges which are the small, medium, and large ranges as above, the method of setting the ranges and the number of the set ranges are not necessarily limited to this example.

The predetermined threshold value compared with the average resource utilization rates need not necessarily be the same for each of the first to third resource groups and may be set to different values (a first threshold value, a second threshold value). In other words, the predetermined threshold value may be set to an appropriate value determined depending on the performance requirements, and the like, for the storage system 5.

At S1213 of FIG. 12A, the tuning plan generating unit 415 judges the contents of the return value of the average resource utilization rate calculation process S1213. If the return value is "OK" (S1213: OK), i.e., if it is determined that the tuning is not necessary, and the process is terminated. If the return value is "NG" (S1213: NG), i.e., if it is determined that the tuning is necessary, the process goes to S1214.

At S1214, the tuning plan generating unit 415 judges the contents of the cost classification 515 of the input information 500 acquired in the input information acquisition processing S811. If "cost oriented" is set for the cost classification 515 (S1214: importance placed on cost), the process goes to step S1215. On the other hand, if "cost not considered" is set (S1214: importance not placed on cost), the process goes to step S1221.

At S1215, the tuning plan generating unit 415 determines based on the configuration information whether or not an unused resource exists that is allocable to the analysis target resource applied as input. If an unused resource exists (S1215: YES), the process goes to S1216, and if an unused resource does not exist (S1215: NO), the process goes to S1221.

At S1216, the tuning plan generating unit 415 adds an unused resource.

At S1217, the tuning plan generating unit 415 executes the average resource utilization rate calculation processing for the configuration of the unused resource added. Details of the average resource utilization rate calculation processing S1217 are the same as the average resource utilization rate calculation processing S1212 above.

At S1218, the tuning plan generating unit 415 judges the return value of the average resource utilization rate calculation process S1217. If the return value is "OK" (S1218: OK), the process goes to S1219. If the return value is "NG" (S1218: NG), the process goes back to S1215.

At S1219, the tuning plan generating unit 415 adds the unused resource acquired from the configuration information acquired at S1211 to generate a tuning plan.

At S1221, the tuning plan generating unit 415 determines based on the configuration information acquired at S1211 whether or not an addition of a resource is possible. If addition of resources is possible (S1221: YES), the process goes to S1222 and if addition of resources is not possible (S1221: NO), the process goes to S1226.

At S1222, the tuning plan generating unit 415 adds resources. At S1223, the tuning plan generating unit 415 executes the average resource utilization rate calculation processing for the configuration after the addition. Details of the average resource utilization rate calculation processing S1223 are the same as the average resource utilization rate calculation processing S1212 above.

At S1224, the tuning plan generating unit 415 judges the return value of the average resource utilization rate calculation processing S1223. If the return value is "OK" (S1224: OK), the processing goes to S1225. If the return value is "NG" (S1224: NG), the processing goes back to S1221.

At S1225, the tuning plan generating unit 415 adds the expandable resource acquired from the configuration information acquired at S1211 to generate a tuning plan.

At S1226, the tuning plan generating unit 415 adds the expandable apparatus (storage apparatus 10) acquired from the configuration information acquired at S1211 to generate a tuning plan.

At S1227, the tuning plan generating unit 415 outputs the tuning plan generated at S1219, S1225, or S1226 to the output device 25.

FIGS. 13A and 13B depict an example of the tuning result output at S1227 if "cost oriented" is set in the cost classification 515 of the input information 500.

As shown in FIG. 13A, the output tuning result includes information indicative of which method was used when generating the tuning result (resource expansion, existing configuration, usage of unused resource, and expansion of apparatus). As shown in FIG. 13B, the output tuning result includes specific details of the tuning method.

In the example shown in FIGS. 13A and 13B, the access destination of the certain CHP 11 (reference value exceeding resource) was only the LDEV 152 belonging to a RAID group (RG5-1) and is distributed to two destinations, which are the LDEV 152 belonging to a RAID group (RG5-2) and the LDEV 152 belonging to a RAID group (RG6-2).

An aspect of the distribution may be specified as a policy described above. For example, if a plurality of movable resources exist, it may be specified whether the move is performed such that the load balance of resources is evened for the respective move destination or such that the load balance is biased.

FIGS. 14A and 14B depict how the resource utilization rates change before and after the execution of the tuning in accordance with the tuning plan of FIG. 13B. FIG. 14A depicts the resource utilization rates before the execution of the relevant tuning in accordance with the tuning and FIG. 14B depicts the resource utilization rates after the execution of the relevant tuning.

FIGS. 15A and 15B depict an example of the tuning result output at S1227 if "cost not considered" is set in the cost classification 515 of the input information 500.

In the example shown in FIGS. 15A and 15B, the access destination of the certain CHP 11 (reference value exceeding resource) was only the LDEV 152 belonging to the RAID group (RG5-1) and is distributed to two destinations, which are expanded resources, the LDEV 152 belonging to the RAID group (RG5-2) and the LDEV 152 belonging to the RAID group (RG6-2).

FIGS. 16A and 16B depict how the resource utilization rates change before and after the execution of the tuning in accordance with the tuning plan of FIG. 14B. FIG. 16A depicts the resource utilization rates before the execution of the relevant tuning in accordance with the tuning and FIG. 16B depicts the resource utilization rates after the execution of the tuning.

As described above, the information apparatus 2 of the present embodiment obtains degrees of correlation between the reference value exceeding resource such as that having a utilization rate exceeding a reference value and the analysis target resources, based on the configuration information and the performance data of the resources. And the analysis target resource correlated with the reference value exceeding resource (the correlated analysis target resource) is automatically selected.

An average resource utilization rate is calculated for a resource group in a certain range on the basis of the selected correlated analysis target resource and a tuning plan is automatically generated for the configuration of resources in the storage system in accordance with a preset policy such that the average resource utilization rate becomes equal to or less than a certain threshold value.

In this way, the information apparatus 2 of the present embodiment automatically executes processing such as the selection of the correlated analysis target resource and the generation of a tuning plan using the average resource utilization rate as a criterion of judgment. Therefore, the analysis and the optimum operation design may be efficiently performed for large-scaled and complicated storage systems.

A plurality of different types of resource groups (the first resource group and the second resource group) is set on the basis of the correlated analysis target resource, and the tuning plan is generated such that the average resource utilization rates calculated for the set resource groups become equal to or less than the threshold values (the first threshold value and the second threshold value) set respectively. Since the information apparatus 2 of the present embodiment sets different types of resource groups and determines the average resource utilization rates to design the tuning plan as above, a more preferred and safe tuning plan can be generated.

Since the tuning plan is generated in accordance with a policy (e.g., cost oriented/cost not regarded), the optimum tuning plan may be generated in accordance with user's requests, operation conditions required for the storage system and the like.

Although the present embodiment has been described as above, the above described embodiment is for the purpose of facilitating the understanding of the present invention and is not for construing the present invention in a limited manner. The present invention may be changed or altered without departing from the spirit thereof and the present invention encompasses equivalents thereof.

The invention claimed is:

1. An information apparatus that generates a tuning plan for a configuration of a resource of a storage system, comprising:
a configuration information acquiring unit that acquires configuration information of the resource of the storage system;
a performance data acquiring unit that acquires performance data of a reference value exceeding resource being the resource having a utilization rate exceeding a preset reference value, and performance data of an analysis target resource, which is a different type of a resource from the reference value exceeding resource, being the resource having a certain relationship with the reference value exceeding resource;
a correlation degree calculating unit that obtains a correlation degree between the reference value exceeding resource and the analysis target resources based on the performance data of the reference value exceeding resource and the performance data of the analysis target resources; and
a tuning plan generating unit that
selects a correlated analysis target resource by referring the correlation degree, the correlated analysis target resource is included in the analysis target resource and having correlation with the reference value exceeding resource,
calculates a first average resource utilization rate of a first resource group including the selected correlated analysis target resource and a resource of a same type as the selected correlated analysis target resource accessed by the reference value exceeding resource,
calculates a second average resource utilization rate of a second resource group including the selected correlated analysis target resource and a resource of a same type as the selected correlated analysis target resource configuring a fail over cluster with the selected correlated analysis target resource,
calculate a third average resource utilization rate of a third resource group including the selected correlated analysis target resource and a resource of a same type as the selected correlated analysis target resource belonging to a same storage apparatus, and
generates a tuning plan for the configuration of the resources of the storage system by adding a resource of a same type as the correlated analysis target resource, if the first average resource utilization rate exceeds a first threshold or the second average resource utilization rate exceeds a second threshold or the third average resource utilization rate exceeds a third threshold.

2. The information apparatus of claim 1, wherein the configuration information includes information that identifies the analysis target resources accessed by the reference value exceeding resource.

3. The information apparatus of claim 1, wherein the performance data of the resource includes a utilization rate of the resource.

4. The information apparatus of claim 1, wherein the certain relationship between the reference value exceeding resource and the analysis target resource is a relationship that the analysis target resource is accessed by the reference value exceeding resource.

5. The information apparatus of claim 1, wherein the tuning plan generating unit acquires a policy that gives an instruction on a method of generating the tuning plan and generates the tuning plan in accordance with the acquired policy.

6. The information apparatus of claim 5, wherein the policy includes specification of whether importance is placed on cost or importance is not placed on cost when generating the tuning plan and
the tuning plan generating unit
generates the tuning plan with priority given to adding the resource that is unused acquired from the configuration information when it is specified to place importance on cost, and
generates the tuning plan based on a premise that a new resource is added when it is specified not to place importance on cost.

7. The information apparatus of claim 6, wherein the tuning plan generating unit generates the tuning plan based on a premise, that a new resource is added when the average resource utilization rate cannot be equal to or less than a predetermined threshold value even when the unused resource is added, although it is specified in the policy to place importance on cost.

8. The information apparatus of claim 1, wherein the storage system is configured to include a storage apparatus comprising a channel control unit that communicates with a host computer, a disc control unit that accesses a storage device in accordance with I/O commands sent from the channel control unit, and a cache memory accessed by the channel control unit and the disc control unit, and wherein
the resource is at least one of the channel control unit, the disc control unit, the cache memory, and a logical device provided by the storage device.

9. The information apparatus of claim 8, wherein the reference value exceeding resource is the channel control unit,
the analysis target resource is the logical device accessed by the channel control unit, and
the tuning plan includes details on a change of the logical device that becomes an access destination of the channel control unit.

10. A method of generating a tuning plan for a configuration of a resource of a storage system, the method making an information apparatus execute the steps of:
acquiring configuration information of a resource of a storage system; acquiring performance data of a reference value exceeding resource being the resource having a utilization rate exceeding a preset reference value, and performance data of an analysis target resource, which is a different type of a resource from the reference value exceeding resource, being the resource having a certain relationship with the reference value exceeding resource;
obtaining a degree of correlation between the reference value exceeding resource and the analysis target resource based on the performance data of the reference value exceeding resource and the performance data of the analysis target resource;
selecting a correlated analysis target resource by referring the correlation degree, the correlated analysis target resource is included in the analysis target resource and having correlation with the reference value exceeding resource;
calculating a first average resource utilization rate of a first resource group including the selected correlated analysis target resource and a resource of a same type as the selected correlated analysis target resource accessed by the reference value exceeding resource;
calculating a second average resource utilization rate of a second resource group including the selected correlated analysis target resource and a resource of a same type as the selected correlated analysis target resource configuring a fail over cluster with the selected correlated analysis target resource;
calculating a third average resource utilization rate of a third resource group including the selected correlated analysis target resource and a resource of a same type as the selected correlated analysis target resource belonging to a same storage apparatus; and
generating a tuning plan for a configuration of a resources of a storage system by adding a resource of a same type as the correlated analysis target resource, if the first average resource utilization rate exceeds a first threshold or the second average resource utilization rate exceeds a second threshold.

11. The method of generating a tuning plan of claim 10, further making the information apparatus execute the step of:
acquiring a policy that gives an instruction on a method of generating the tuning plan and generating the tuning plan in accordance with the acquired policy.

12. The method of generating a tuning plan of claim 11, wherein the policy includes specification of whether importance is placed on cost or importance is not placed on cost when generating the tuning plan and makes the information apparatus generate the tuning plan with priority given to adding the resource that is unused acquired from the configuration information when it is specified to place importance on cost, and
generate the tuning plan based on a premise that a new resource is added when it is specified not to place importance on cost.

13. The method of generating a tuning plan of claim 12, further making the information apparatus execute the step of:
generating the tuning plan based on the premise that a new resource is added when the average resource utilization rate cannot be equal to or less than a predetermined threshold value even when the unused resource is added, although it is specified in the policy to place importance on cost.

* * * * *